United States Patent
Oosawa (10) Patent No.: US 7,315,635 B2
(45) Date of Patent: Jan. 1, 2008

(54) ANATOMICAL CHARACTERISTIC POSITION DETECTING SYSTEM, AND OBJECT STRUCTURE MEASUREMENT SYSTEM

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 640 days.

(21) Appl. No.: 10/455,417

(22) Filed: Jun. 6, 2003

(65) Prior Publication Data
US 2003/0228040 A1 Dec. 11, 2003

(30) Foreign Application Priority Data
Jun. 6, 2002 (JP) ............... 2002-165104

(51) Int. Cl.
*G06K 9/00* (2006.01)
(52) U.S. Cl. ...................... 382/128; 382/130
(58) Field of Classification Search ........ 382/128–134, 382/190, 195, 201, 203, 204, 286, 287; 128/922; 600/425, 431
See application file for complete search history.

(56) References Cited

U.S. PATENT DOCUMENTS

| | | | |
|---|---|---|---|
| 5,790,690 A | * | 8/1998 | Doi et al. .................. 382/128 |
| 5,862,249 A | * | 1/1999 | Jang et al. .................. 382/132 |
| 5,943,435 A | * | 8/1999 | Gaborski .................... 382/132 |
| 6,011,862 A | * | 1/2000 | Doi et al. .................... 382/132 |
| 6,678,703 B2 | * | 1/2004 | Rothschild et al. ......... 382/132 |
| 2002/0057828 A1 | * | 5/2002 | Oosawa et al. ............. 382/132 |
| 2002/0085743 A1 | * | 7/2002 | Kawano .................... 382/132 |
| 2003/0210813 A1 | * | 11/2003 | Oosawa ..................... 382/130 |

FOREIGN PATENT DOCUMENTS

JP 2003-6661 A 1/2003

OTHER PUBLICATIONS

Eigenfaces for Recognition, Journal of Cognitive Neuroscience, vol. 3, No. 1, 1991.
T.F. Cootes et al., "Active Appearance Models", *Active Appearance Models, Proc. European Conference on Computer Vision*, vol. 2, pp. 484-498, Springer, 1998.

* cited by examiner

*Primary Examiner*—Matthew C. Bella
*Assistant Examiner*—Shefali Patel
(74) *Attorney, Agent, or Firm*—Sughrue Mion, PLLC

(57) ABSTRACT

Shape information for use in generating an artificial image corresponding to an input medical image of an object is obtained, and an anatomical characteristic position of the object is detected on the basis of the shape information obtained.

5 Claims, 7 Drawing Sheets

ANATOMICAL CHARACTERISTIC POSITION DETECTING SYSTEM, AND OBJECT STRUCTURE MEASUREMENT SYSTEM

BACKGROUND OF THE INVENTION

1. Field of the Invention

This invention relates to an anatomical characteristic position detecting system and an object structure measurement system for aiding in diagnosing anatomical structure of an object on the basis of a medical image.

2. Description of the Related Art

It has been carried out to measure a structural part such as a bone or an organ by the use of a medical image. For example, when diagnosing cardiomegaly, the widths of the thorax and the heart are measured by the use of a chest radiation image and the ratio of the latter to the former (cardiothoracic ratio) is calculated.

Conventionally, the widths of the thorax and the heart have been manually measured by applying a scale to the chest radiation image. Recently, an image is often digitized and handled as digital image data, and there is a demand for automatically calculating the cardiothoracic ratio on the basis of the digital image data.

In order to meet this demand, there have been proposed various technologies of automatically calculating the cardiothoracic ratio. To calculate the cardiothoracic ratio, it is necessary to identify the profiles of the thorax and the heart (cardiothorax). As the method of detecting the profile of the cardiothorax, there have been known a method disclosed in U.S. Pat. Nos. 5,790,690 and 6,011,862 where the profile of the thorax (a region including the left and right lungs), which is a closed region, is detected and a method proposed by Mr. Katsuragawa where the profile of the heart is detected by the use of a deformation ellipse model function. Further, there has been proposed in U.S. Laid-Open No. 20020057828 a method where the image of the chest is expressed in a polar coordinate system, the profile of the cardiothorax is automatically detected by template matching on the plane of the polar coordinate system by the use of a template which is substantially similar to the average cardiothorax profile (a reference profile), and the cardiothoracic ratio is calculated on the basis of the automatically detected profile of the cardiothorax.

However, it has been found that by the method disclosed in U.S. Laid-Open No. 20020057828, the error of the detected cardiothorax profile from the actual profile is too large to obtain an accuracy necessary to diagnosis. Accordingly, this applicant has proposed in Japanese Unexamined Patent Publication No. 2003-6661 a more accurate method where the cardiothorax profile is divided into a plurality of regions and the regions are recombined after edges on borders of regions are detected.

However, the method disclosed in Japanese Unexamined Patent Publication No. 2003-6661 is disadvantageous in that edges on borders cannot be accurately found when fat is on the heart due to heart disease or edges are not clear due to noise.

SUMMARY OF THE INVENTION

In view of the foregoing observations and description, the primary object of the present invention is to provide an anatomical characteristic position detecting system and an object structure measurement system which make it feasible to detect anatomical characteristic positions and to measure structural physical values of an object on the basis of information on the detected characteristic positions even if the image has a part which is unclear to know the anatomical structure of the object.

In accordance with a first aspect of the present invention, there is provided an anatomical characteristic position detecting system comprising a shape information obtaining means which obtains shape information for use in generating an artificial image corresponding to an input medical image of an object, and an anatomical characteristic position detecting means which detects an anatomical characteristic position of the object on the basis of the shape information obtained by the shape information obtaining means.

In accordance with a second aspect of the present invention, there is provided an object structure measurement system comprising a shape information obtaining means which obtains shape information for use in generating an artificial image corresponding to an input medical image of an object, an anatomical characteristic position detecting means which detects an anatomical characteristic position of the object on the basis of the shape information obtained by the shape information obtaining means, and a measurement means which measures a structural physical value of the object on the basis of the anatomical characteristic position of the object detected by the anatomical characteristic position detecting means.

The "artificial image corresponding to an input medical image of an object" means an artificial image representing an object substantially conforming in structure to the object of the input medical image.

The "structural physical value of an object" is a value of the anatomic structure of the object which can be geometrically measured or calculated, and may be, for instance, the angle, the length, the area, the roundness, the flatness or a value calculated by a combination of two or more these factors. When the object is a chest, the "structural physical value of an object" may be a combination of the maximum widths of the thorax and the heart or the cardiothoracic ratio (the ratio of the width of the heart to the width of the thorax)

The "shape information obtaining means" may be a means which obtains shape information for use in generating an artificial image of the object by the use of a technology of AAM (Active Appearance Model). The technology of AAM is a method of generating an artificial image using shape information and texture information, and, for example, generates an artificial image by warping a density pattern represented by the texture information into a shape represented by the shape information. The shape information and the texture information can be represented by a linear sum of eigen vectors of the shape or the texture of an object obtained by carrying out statistical processing on a plurality of images each representing the structure of the object as samples. By controlling a parameter obtained by integrating the eigen vectors, substantially any shape or substantially any texture can be obtained. The shape information of the object of the input medical image can be obtained by generating an artificial image representing an object substantially conforming in structure to the object of the input medical image. This can be accomplished by searching for a value of the parameter which minimizes the difference between corresponding pixels of the input medical image and the artificial image by changing the shape and the texture of the artificial image by controlling the parameter. (This technology will be described in detail later.)

The shape information clearly represents the shape of the object independently of clearness of the anatomic structure of the object represented by the texture information. Accordingly, when an artificial image substantially conforming to an image of the object including an unclear part is generated, anatomical characteristic positions of the object can be clearly detected on the basis of the shape information obtained at that time.

In the anatomical characteristic position detecting system and the object structure measurement system in accordance with the first and second aspects of the present invention, the shape information obtaining means may obtain a plurality of pieces of shape information for use in generating an artificial image corresponding to the input medical image of the object by a plurality of anatomical structural regions of the object.

The "anatomical structural region" as used here means, for instance, when the object is a chest, the thorax, the heart and the like, but may include a background together with such an anatomical structural region. Further, the "anatomical structural region" as used here means a part of the anatomical structural region such as the thorax, the heart or the like.

In accordance with a third aspect of the present invention, there is provided an anatomical characteristic position detecting system comprising an artificial image storage means in which a plurality of pieces of artificial image data representing different object structures an are stored with each piece of artificial image data attached with shape information on the shape of the object represented by the artificial image data, an artificial image selection means which selects an artificial image representing an object substantially conforming in structure to the object of an input medical image out of the images represented by the plurality of pieces of image data stored in the artificial image storage means, and an anatomical characteristic position detecting means which detects an anatomical characteristic position of the object on the basis of the shape information attached to the artificial image selected by the artificial image selection means.

In accordance with a fourth aspect of the present invention, there is provided an object structure measurement system comprising an artificial image storage means in which a plurality of pieces of artificial image data representing different object structures are stored with each piece of artificial image data attached with shape information on the shape of the object represented by the artificial image data, an artificial image selection means which selects an artificial image representing an object substantially conforming in structure to the object of an input medical image out of the images represented by the plurality of pieces of image data stored in the artificial image storage means, an anatomical characteristic position detecting means which detects an anatomical characteristic position of the object on the basis of the shape information attached to the artificial image selected by the artificial image selection means, and a measurement means which measures a structural physical value of the object on the basis of the anatomical characteristic position of the object detected by the anatomical characteristic position detecting means.

That is, in the anatomical characteristic position detecting system and the object structure measurement system in accordance with the third and fourth aspects of the present invention, an artificial image representing an object substantially conforming in structure to the object of an input medical image is selected out of the images represented by the plurality of pieces of image data which have been generated and stored in the artificial image storage means, and an anatomical characteristic position of the object is detected on the basis of the shape information attached to the artificial image selected by the artificial image selection means, unlike in those in accordance with the first and second aspects of the present invention, where shape information for use in generating an artificial image substantially conforming in structure to the object of an input medical image is obtained.

A computer program for causing a computer to perform the function of the anatomical characteristic position detecting system or the object structure measurement system in accordance with the present invention or each of the means of the systems may be recorded in a computer readable medium so that the computer can perform the function when loaded with the recording medium. A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

The medical image need not be limited to a radiation image but may any image so long as it represents anatomical object structure. For example, the medical image may be an image obtained by a CT system or an MRI system.

The "image" as used here should be broadly interpreted to include image data as well as a visible image actually displayed. For example, an expression "to obtain an image" includes to merely obtain image data on the basis of which an image is displayed.

In the anatomical characteristic position detecting system in accordance with the first aspect of the present invention, anatomical characteristic positions of an object can be detected even if the image has a part which is unclear to detect the anatomical object structure, since shape information for use in generating an artificial image corresponding to an input medical image of an object is obtained, and the anatomical characteristic positions of the object are detected on the basis of the shape information obtained.

In the anatomical characteristic position detecting system in accordance with the first aspect of the present invention, when the shape information is obtained by a plurality of anatomical structural regions of the object, the shape information can be finely fitted to the input medical image and the accuracy of detecting the anatomical characteristic position of the object is improved.

In the object structure measurement system in accordance with the second aspect of the present invention, anatomical characteristic positions of an object can be detected and a structural physical value of the object can be measured even if the image has a part which is unclear to detect the anatomical object structure, since shape information for use in generating an artificial image corresponding to an input medical image of an object is obtained, the anatomical characteristic positions of the object are detected on the basis of the shape information obtained and a structural physical value of the object is measured on the basis of the anatomical characteristic position of the object detected.

In the object structure measurement system in accordance with the second aspect of the present invention, when the shape information is obtained by a plurality of anatomical structural regions of the object, the shape information can be finely fitted to the input medical image and the accuracy of measuring the structural physical value of the object is improved.

In the anatomical characteristic position detecting system in accordance with the third aspect of the present invention, anatomical characteristic positions of an object can be detected even if the image has a part which is unclear to detect the anatomical object structure as in the anatomical characteristic position detecting system in accordance with the first aspect of the present invention, since an artificial image representing an object substantially conforming in structure to the object of an input medical image is selected out of the images represented by the plurality of pieces of image data which have been generated and stored in the artificial image storage means, and the anatomical characteristic positions of the object are detected on the basis of the shape information attached to the artificial image selected by the artificial image selection means.

In the object structure measurement system in accordance with the fourth aspect of the present invention, anatomical characteristic positions of an object can be detected and a structural physical value of the object can be measured even if the image has a part which is unclear to detect the anatomical object structure as in the object structure measurement system in accordance with the second aspect of the present invention, since an artificial image representing an object substantially conforming in structure to the object of an input medical image is selected out of the images represented by the plurality of pieces of image data which have been generated and stored in the artificial image storage means, the anatomical characteristic positions of the object are detected on the basis of the shape information attached to the artificial image selected by the artificial image selection means and a structural physical value of the object is measured on the basis of the anatomical characteristic positions of the object detected.

DESCRIPTION OF THE PREFERRED EMBODIMENTS

Figure 1:
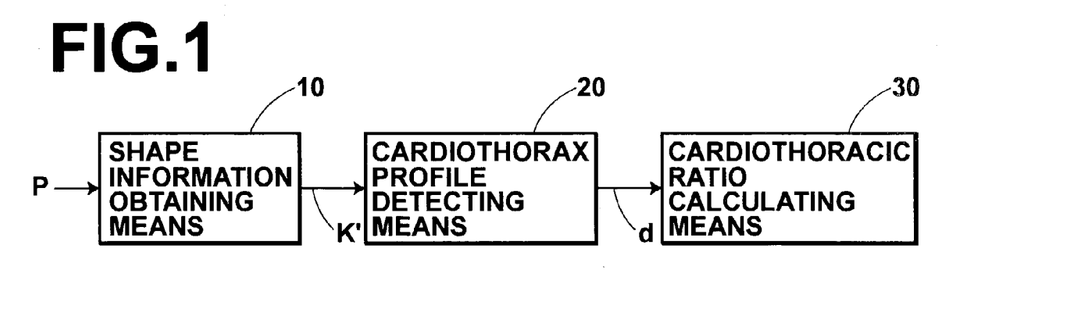
FIG. 1 is a schematic view showing cardiothoracic ratio measuring system in accordance with a first embodiment of the present invention.

In FIG. 1, a cardiothoracic ratio measuring system in accordance with a first embodiment of the present invention comprises a shape information obtaining means 10 which obtains shape information K' by generating an artificial image P' representing a chest substantially conforming in structure to an input chest radiation image P by the use of shape information K' and texture information T' obtained by changing a parameter obtained by integrating the eigen vectors of shape and texture, a cardiothorax profile detecting means 20 (an anatomical characteristic position detecting means) which detects a profile of the cardiothorax of the object on the basis of the shape information K', and a cardiothoracic ratio calculating means (a measurement means) 30 which calculates the cardiothoracic ratio of the object on the basis of information d on the position of the profile of the cardiothorax detected by the cardiothorax profile detecting means 20.

Operation of the cardiothoracic ratio measuring system of this embodiment will be described, hereinbelow.

Figure 9:
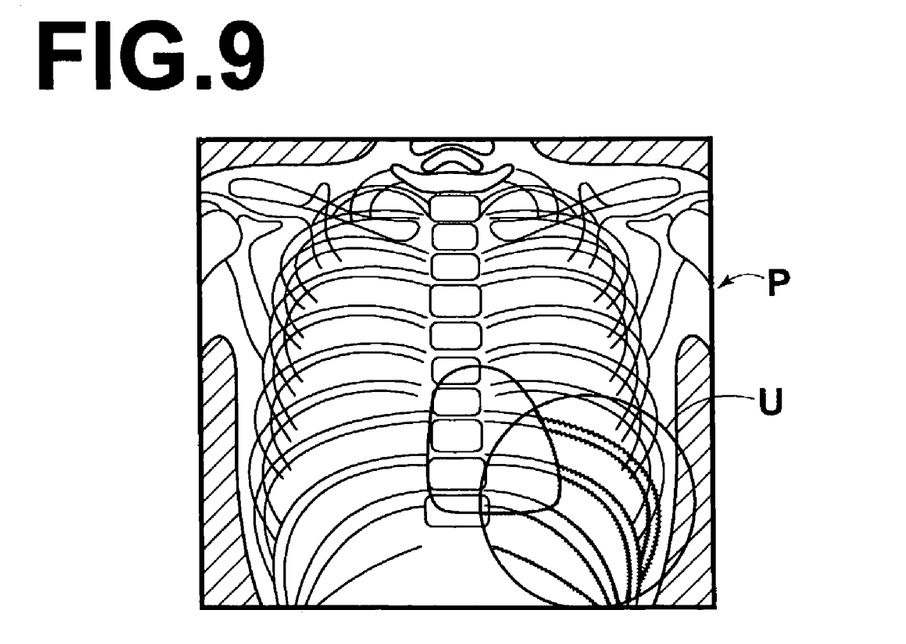
FIG. 9 is a view showing a chest radiation image including a part whose anatomical structure is unclear.

When a chest radiation image P including a part U whose anatomical structure is unclear as shown in FIG. 9 is input, the shape information 10 obtains shape information K' according to a technology of AAM to be described later by generating an artificial image P' corresponding to the input chest radiation image P (representing a chest substantially conforming in structure to the input chest radiation image P) by the use of shape information K' and texture information T' obtained by changing a parameter obtained by integrating the eigen vectors of shape and texture.

The technology of AAM according to which an artificial image is generated will be described, hereinbelow.

The technology of AAM has been proposed by Cootes et al of the university of Manchester and is disclosed in "Active Appearance Model (AAM)"[T. F. Cootes, and C. J. Taylor, Active Appearance Models, Proc, European Conference on Computer Vision, Vol.2, pp.484-498, Springer, 1998].

In this embodiment, images stored in a database in which a plurality of different images each representing an anatomical object structure are stored and anatomical characteristic shapes (landmarks) extracted from the images stored in the database are used as teacher data and applied to the AAM. A statistical model of object structure (a model of change of shape, a model of change of texture and a model of correlation between the shape and the texture) is made on the basis of the teacher data, and by the use of the statistical model, substantially any artificial image (in shape and texture) corresponding to the input image can be obtained.

Though it is preferred that the images stored in the database be actually photographed in view of making a statistical model of the object structure, they may be artificial images made at random with the characteristic basic object structure held in the case where a sufficient number of images are not stored in the database. It is necessary to store also an image of an object having an abnormal structure so that an artificial image corresponding to an image of a diseased object such as those suffered from cardiomegaly can be generated.

The steps of generating an artificial image corresponding to an input image will be described on the case where a chest radiation image is input, by way of example, hereinbelow.

Figure 2:
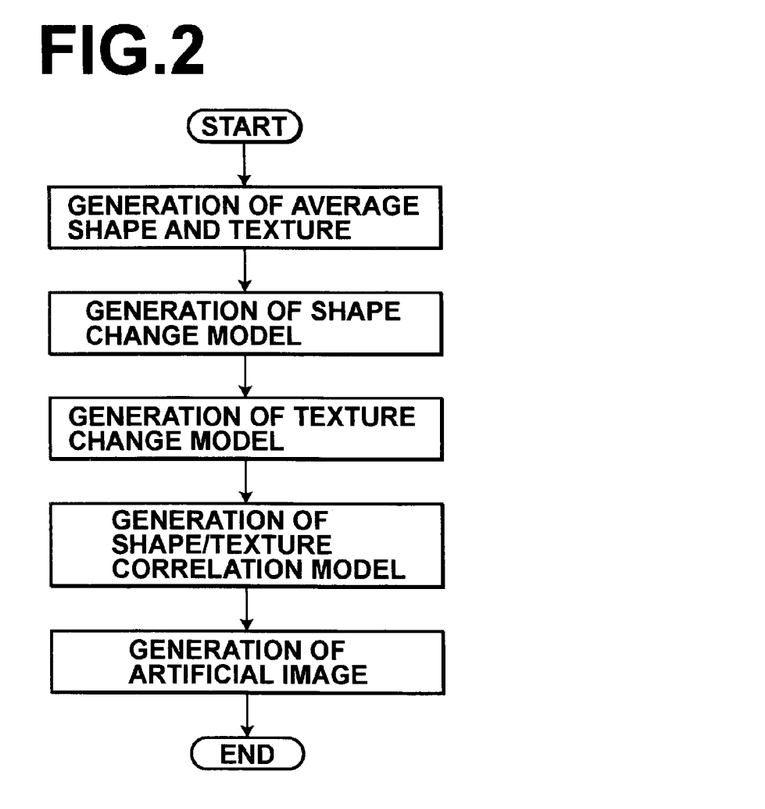
FIG. 2 is a flow chart for illustrating the steps of generating an artificial image.

In step #1, an average shape and an average texture are generated.

Figure 3A:
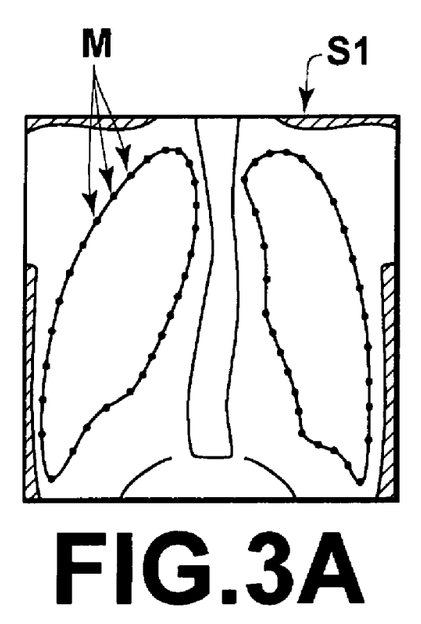
FIGS. 3A to 3C show landmarks attached to chest images on the outer edge of the lungs.
Figure 3B:
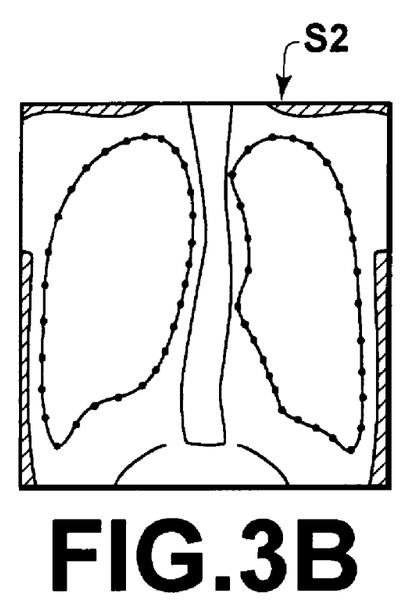
Figure 3C:
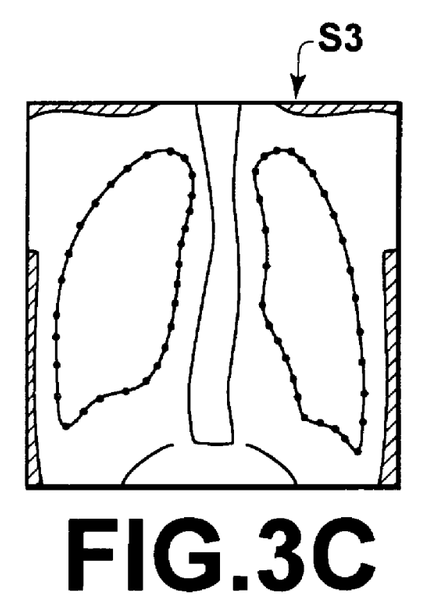
Figure 4:
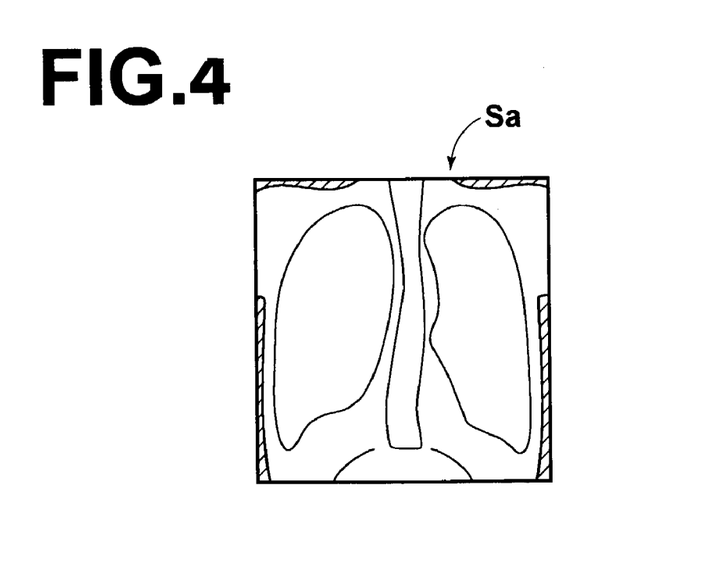
FIG. 4 shows an image representing an average shape of chests.
Figure 5:
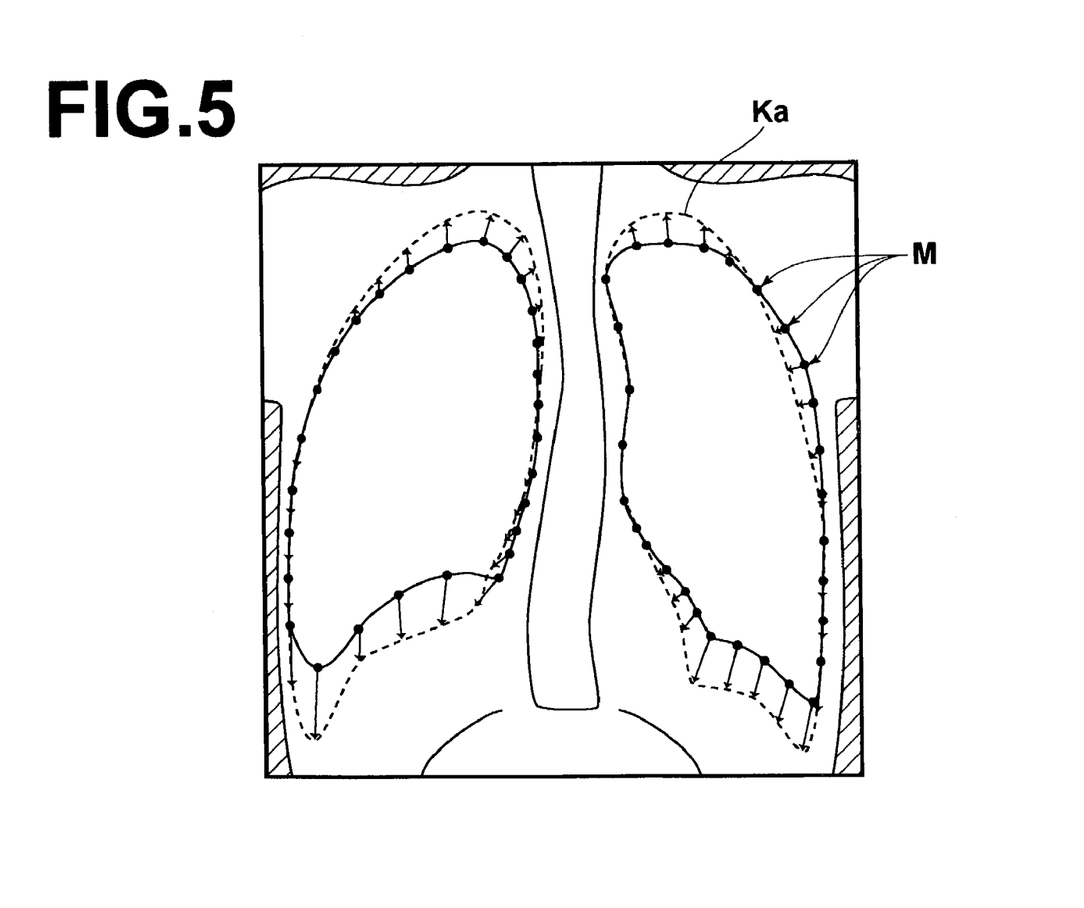
FIG. 5 shows warping of the landmarks attached on the outer edge of the lungs to the average object shape.

Anatomical characteristic shapes of the objects are first extracted from the images stored in the database as land marks. FIGS. 3A to 3C show landmarks attached to chest images S1, S2 and S3 on the outer edge of the lungs. A plurality of black dots indicated at M in FIGS. 3A to 3C are landmarks. The points employed as the landmarks are anatomically equivalent points in the images shown in FIGS. 3A to 3C. Average object shape is made on the basis of the shapes of the objects represented by the landmarks. FIG. 4 shows an image Sa representing an average shape of chests. When the shape of the object is extracted in the form of landmarks, it is preferred that the parallel displacement components be normalized in advance. For example, in the case of a chest radiation image, the upper ends of the lungs are aligned with the horizontal center line Then in order to warp the images in the database to the average object shape thus made, the amount of shift of each landmark on each image to that of the average object shape is calculated. FIG. 5 shows warping of the landmarks attached on the outer edge of the lungs to the average object shape (indicated Ka in FIG. 5). The amount of shift of each land mark is approximated by the use of the following two-dimensional quintic polynomial approximation.

$$x' = x + \Delta x \quad (1)$$

$$y' = y + \Delta y \quad (2)$$

$$\Delta x = \sum_{i=0}^{n} \sum_{j=0}^{n-i} a_{ij} \cdot x^i \cdot y^j \quad (3)$$

$$\Delta y = \sum_{i=0}^{n} \sum_{j=0}^{n-i} b_{ij} \cdot x^i \cdot y^j \quad (4)$$

wherein x and y are coordinates of each landmark, x' and y' are the amounts of shift of each landmark to the average object shape to which the landmark is warped, n is the order, and $a_{ij}$ and $b_{ij}$ are coefficients. The coefficients in polynomial approximation are obtained by a least squares method.

By the use of the above formulae, the amount of shift of each pixel to the average object shape is calculated for each image and the pixel is warped. The values of pixels which are warped to positions which are represented by not integers but figures including a decimal are obtained by first-order approximation on the basis of four pixels around the pixel. That is, the value of the pixel is distributed to the four pixels around the pixel in proportion to the distances from the pixel to the four pixels after the warping. Then average texture are obtained from the images warped to the average object shape.

At this time point, the average shape of the images stored in the database, images warped to the average shape and the average texture are obtained.

In step #2, a model of change of shape is generated.

Figure 6A:
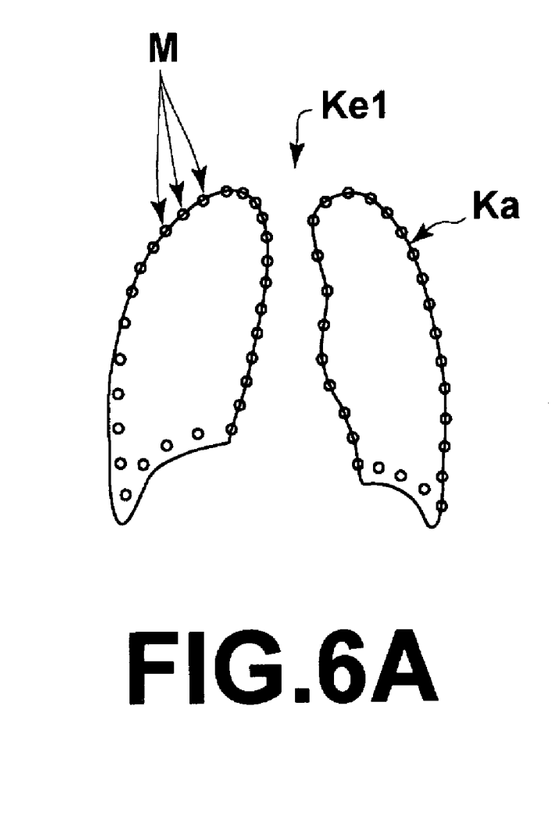
FIGS. 6A to 6C are views respectively showing different eigen shapes represented by landmarks.
Figure 6B:
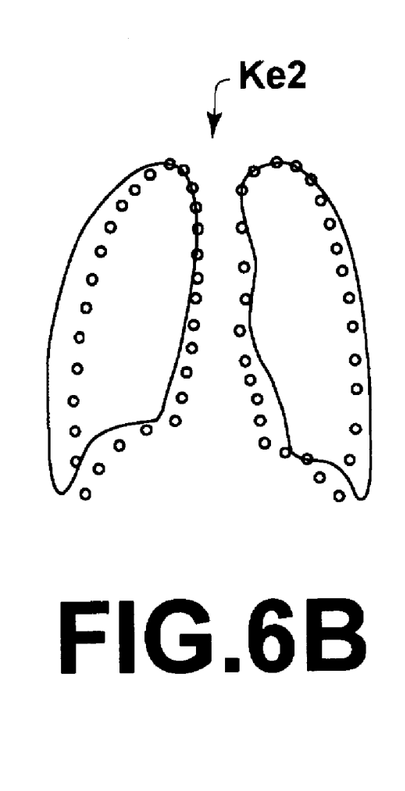
Figure 6C:
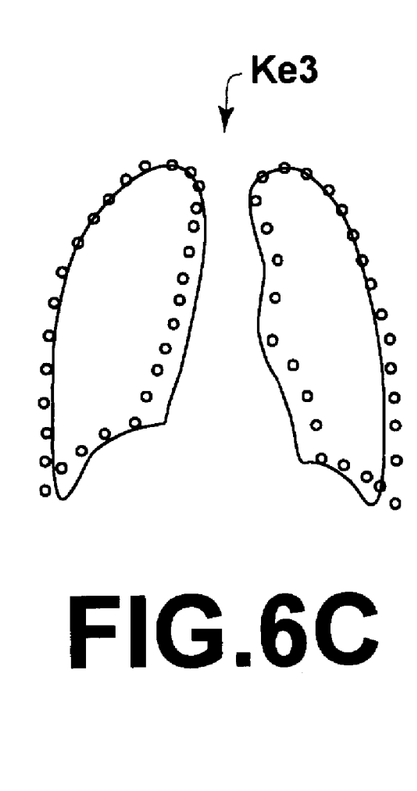

An eigen shape is calculated by carrying out a principal component analysis on the shape of the object by the use of each shape of the images stored in the database and the average shape. For example, eigen vectors can be obtained by a method disclosed in [Matthew Turk, Alex Pentl and, Eigenfaces for recognition, Journal of Cognitive Neuroscience, vol. 3, num 1, 1991]. Any shape can be approximated as follows by the use of the linear sum of eigen shapes.

$$x = x_{ave} + P_s \cdot b_s \quad (5)$$

wherein x is a shape factor (x1, y1, ..., xi, yi, ..., xn, yn), xave is an average shape vector, PS is an eigenvector of shape, and bs is a set of shape factors. FIGS. 6A to 6C are views respectively showing different eigen shapes Ke1, Ke2 and Ke3 represented by landmarks M. In FIGS. 6A to 6C, the solid line Ka shows the average shape.

In step #3, a model of change of texture is generated.

Figure 7A:
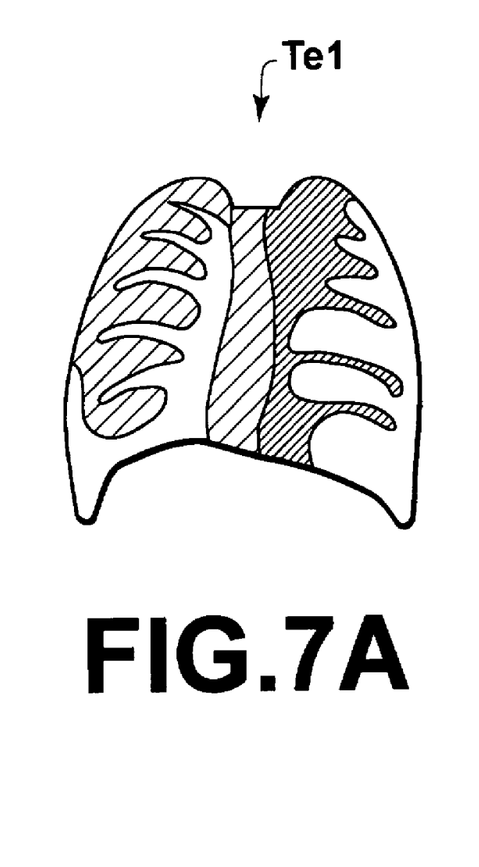
FIGS. 7A to 7C are views respectively showing different eigen textures.
Figure 7B:
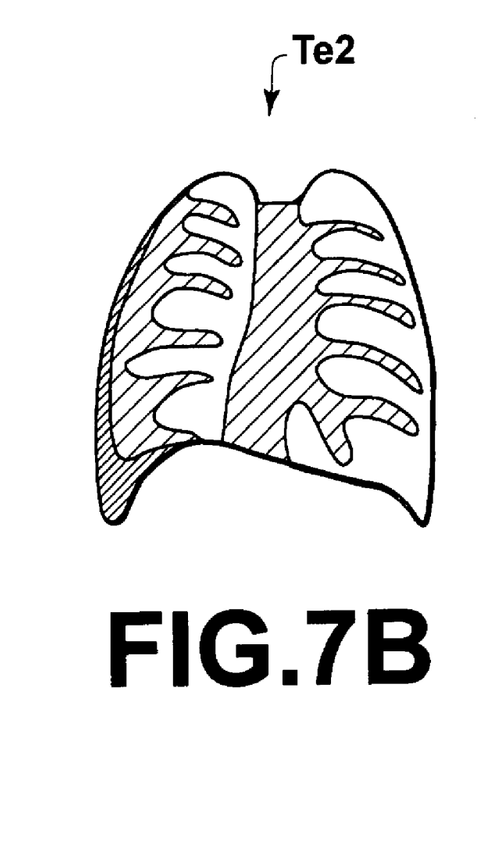
Figure 7C:
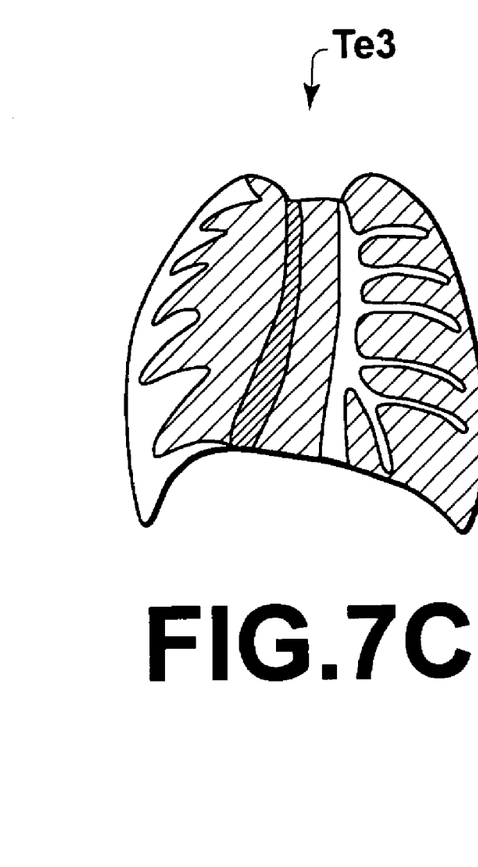

An eigen texture is calculated by carrying out a principal component analysis on the texture of the object by the use of each texture of the images stored in the database and the average texture.

$$g = g_{ave} + P_g \cdot b_g \quad (6)$$

wherein g is a factor of gray level (a pixel value of texture) (g11, g21, ..., gij, ...,gnn), gave is a vector of the average gray level, Pg is an eigenvector of gray level, and bg is a set of gray level factors. FIGS. 7A to 7C are views respectively showing different eigen textures Te1, Te2 and Te3.

In step #4, a model of correlation between the shape and the texture is generated. The shape/texture of each of the images stored in the database can be expressed by coefficients $b_s$ and $b_g$ which are values obtained by projection onto each eigen shape/eigen texture. An appearance parameter for controlling the shape and the gray level is calculated by carrying out a principal component analysis on the coefficients as follows.

$$b = \begin{pmatrix} W_s \cdot b_s \\ b_g \end{pmatrix} = \begin{pmatrix} W_s \cdot P_s^T \cdot (x - x_{ave}) \\ P_g^T \cdot (g - g_{ave}) \end{pmatrix} \quad (7)$$

wherein $W_s$ is a diagonal matrix and a weight on each shape coefficient.

$$b = Q \cdot c \quad (8)$$

wherein Q is an eigenvector and c is an appearance parameter for controlling the shape and the gray level (c is 0 in average.) By varying the appearance parameter, substantially any artificial image of the object can be obtained from the images stored in the database.

In step #5, an artificial image is generated. An artificial image is generated for an input radiation image in the following manner.

1. An appearance parameter calculated on the basis of the average shape and images in the average shape is set as an initial value.

2. Artificial images are generated while changing the parameter from an appearance parameter for an uppermost eigen vector and an appearance parameter which minimizes the difference between the input radiation image and the generated artificial image is searched for.

3. An artificial image obtained on the basis of the value of the appearance parameter obtained in step 2 is selected as an artificial image corresponding to the input radiation image.

In accordance with the above method, when elements such as the average shape/texture, the eigen shape/eigen texture and the eigenvector Q of the object, have been obtained in advance, substantially any artificial image of the object can be generated by simply controlling the appearance parameter c.

In this embodiment, it is assumed that the above elements have been obtained for the chest radiation image (a medical image of the object) and an artificial image P' corresponding to the input chest radiation P can be generated and the shape information can be obtained by simply controlling the appearance parameter c. Accordingly, the database is not essential to the object structure measurement system.

Figure 8:
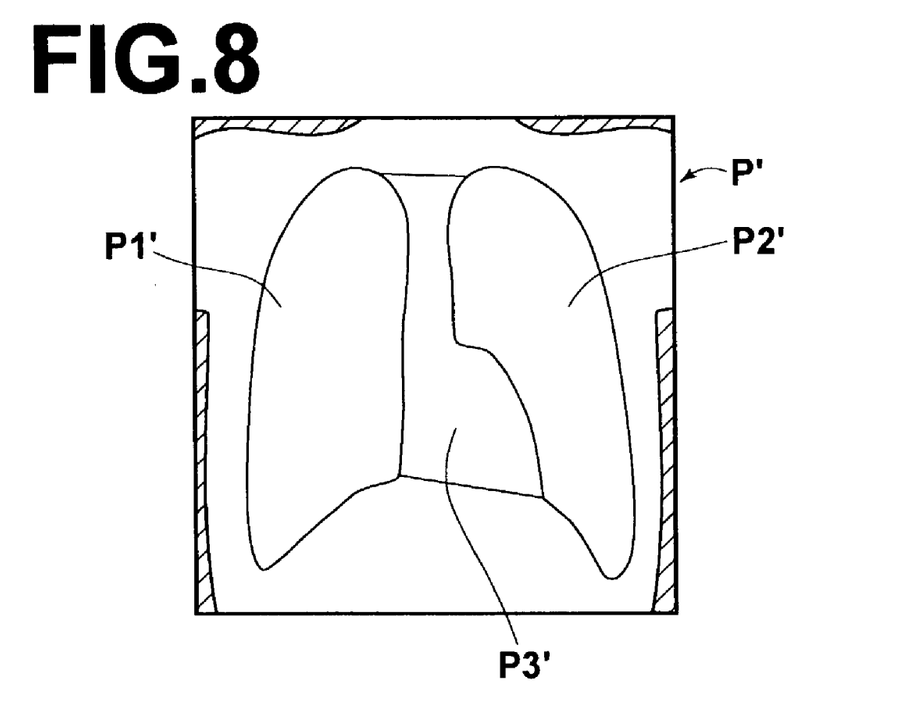
FIG. 8 is a view showing the partial artificial images.

In this embodiment, the artificial image P' is divided into three anatomical structural regions, the right lung region, the left lung region and the heart region as shown in FIG. 8 and three partial artificial images P1', P2' and P3' corresponding to the respective regions are generated, whereby three pieces of shape information K1', K2' and K3' for the respective anatomical structural regions are obtained. That is, each of the images stored in the database is divided into the three anatomical structural regions, and the above models are generated by the regions. Then the values of appearance parameters c1, c2 and c3 defined by the following formulae (9) to (11) which minimize the difference ΔD defined by the following formula (12) are obtained and the partial artificial images P1', P2' and P3' are generated.

$$b1 = Q1 \cdot c1 \quad (9)$$

$$b2 = Q2 \cdot c2 \quad (10)$$

$$b3 = Q3 \cdot c3 \quad (11)$$

$$\Delta D = w1|\Delta(P1-P1')| + w2|\Delta(P2-P2')| + w3|\Delta(P3-P3')| \quad (12)$$

wherein P1, P2 and P3 are partial images corresponding to the respective anatomical regions of the input chest radiation image P, Δ (Pi−Pi') is the total of the difference between the values of corresponding pixels of the partial image and the partial artificial image, and w1, w2 and w3 are weight from 0 to 1.

The profile of the cardiothorax from which the widths of the thorax and the heart necessary to calculate the cardiothoracic ratio can be obtained by obtaining pieces of shape information K1', K2' and K3' for the respective anatomical structural regions. (Though the profile of the upper and lower portions of the heart is not accurately obtained, it involves no problem since the width is only measured.) Generally, by dividing an artificial image into a plurality of regions, the degree of freedom in adjusting the artificial image is increased and an artificial image more accurately corresponding to the input medical image can be generated.

Figure 10:
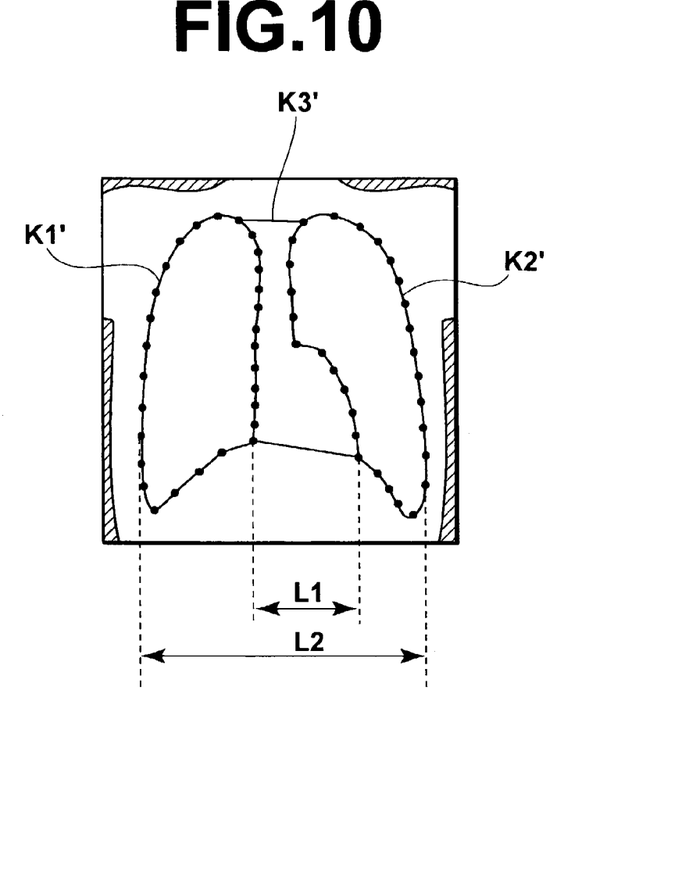
FIG. 10 is a view showing the landmarks and the profile of the cardiothorax obtained by joining the landmarks with lines.

The cardiothorax profile detecting means 20 detects the profile of the cardiothorax in this manner on the basis of the pieces of shape information K1', K2' and K3' for the respective anatomical structural regions of the object obtained upon generation of the partial artificial images P1', P2' and P3'. The shapes represented by the respective pieces of shape information K1', K2' and K3' are expressed by, for instance, landmarks. The profile of the cardiothorax can be derived from the landmarks by joining the landmarks with lines, for instance, by smoothing or first-order approximation. FIG. 10 shows the landmarks and the profile of the cardiothorax obtained by joining the landmarks with lines by the above method.

When detected position information d is input into the cardiothorax ratio calculating means 30, the cardiothorax ratio calculating means 30 detects the maximum width L2 of the thorax and the maximum width L1 of the heart and calculates the cardiothorax ratio (L1/L2).

In accordance with the conventional technology where a profile of the object is extracted from a medical image, when the input image includes an unclear portion, the profile of the object cannot be detected to cause errors and even if the profile of the object can be detected, the calculated structural physical values contains a large error. To the contrast, in the cardiothoracic ratio measuring system of this embodiment, the profile of the object can be obtained even for an input image including an unclear portion by generating an artificial image corresponding to the input image and obtaining shape information, and accordingly, the structural physical values can be accurately measured.

Figure 11:
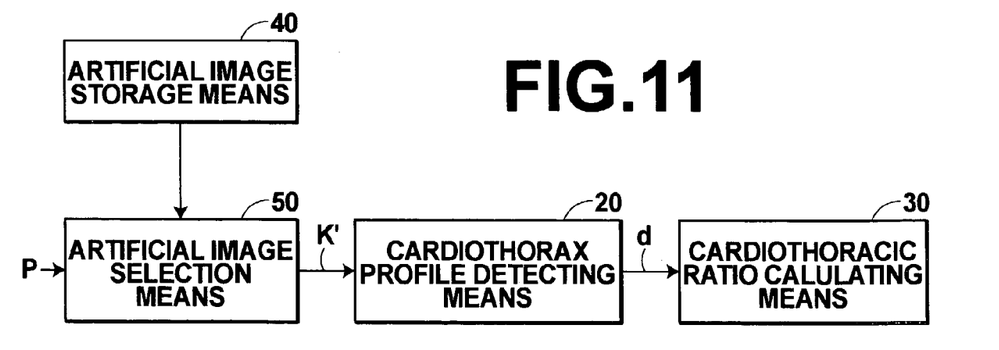
FIG. 11 is a schematic view showing cardiothoracic ratio measuring system in accordance with a second embodiment of the present invention.

A cardiothoracic ratio measuring system in accordance with a second embodiment of the present invention will be described with reference to FIG. 11, hereinbelow. As shown in FIG. 11, the cardiothoracic ratio measuring system of this embodiment comprises an artificial image storage means 40 in which a plurality of pieces of artificial image data representing different object structures are stored with each piece of artificial image data attached with shape information on the shape of the object represented by the artificial image data, an artificial image selection means 50 which selects an artificial image representing an object substantially conforming in structure to the object of an input medical image P out of the images represented by the plurality of pieces of image data stored in the artificial image storage means 40, a cardiothorax profile detecting means 20 (an anatomical characteristic position detecting means) which detects a profile of the cardiothorax of the object on the basis of the shape information K' attached to the artificial image data selected by the artificial image selection means 50, and a cardiothoracic ratio calculating means (a measurement means) 30 which calculates the cardiothoracic ratio of the object on the basis of information d on the position of the profile of the cardiothorax detected by the cardiothorax profile detecting means 20.

In the cardiothoracic ratio measuring system of this embodiment, an artificial image P' representing a chest substantially conforming in structure to the chest represented by the input medical image P is selected out of the artificial images which have been generated and stored in the artificial image storage means 40, and the cardiothoracic ratio of the object is calculated on the basis of the shape information K' attached to the artificial image P' selected by the artificial image selection means 50, unlike in the cardiothoracic ratio measuring system of the first embodiment, where shape information is obtained by generating an artificial image for the input image P.

Also in this embodiment, the artificial image P' may be divided into anatomical structural regions, e.g., the right lung region, the left lung region and the heart region and partial artificial images corresponding to the respective regions may be selected.

What is claimed is:

1. An anatomical characteristic position detecting system comprising:
   a shape information obtaining means which obtains shape information for use at least in generating an artificial image corresponding to an input medical image of an object, and
   an anatomical characteristic position detecting means which detects an anatomical characteristic position of the object on the basis of the shape information obtained by the shape information obtaining means, wherein the obtaining of the shape information comprises:
determining an average shape based on a plurality of radiation images of objects substantially similar to the object in the input medical image,
determining eigenvectors for deforming the average shape, wherein the eigenvectors are based on the average shape and the plurality of radiation images of the objects substantially similar to the object in the input medical image,
extracting data corresponding to a shape of the object in the input medical image,
determining a parameter based on at least a portion of the data extracted from the object in the input medical image such that a shape of the artificial image approximates the extracted data, and
estimating the shape information based on the determined parameter, the determined average shape and the determined eigenvectors.

2. An object structure measurement system comprising:
a shape information obtaining means which obtains shape information for use at least in generating an artificial image corresponding to an input medical image of an object,
an anatomical characteristic position detecting means which detects an anatomical characteristic position of the object on the basis of the shape information obtained by the shape information obtaining means, and
a measurement means which measures a structural physical value of the object on the basis of the anatomical characteristic position of the object detected by the anatomical characteristic position detecting means,
wherein the obtaining of the shape information comprises:
determining an average shape based on a plurality of radiation images of objects substantially similar to the object in the input medical image,
determining eigenvectors for deforming the average shape, wherein the eigenvectors are based on the average shape and the plurality of radiation images of the objects substantially similar to the object in the input medical image,
extracting data corresponding to a shape of the object in the input medical image,
determining a parameter based on at least a portion of the data extracted from the object in the input medical image such that a shape of the artificial image approximates the extracted data, and
estimating the shape information based on the determined parameter, the determined average shape and the determined eigenvectors.

3. An object structure measurement system as defined in claim 2 wherein the structural physical value comprises a cardiothoracic ratio.

4. An anatomical characteristic position detecting system comprising:
an artificial image storage means in which a plurality of pieces of artificial image data representing different object structures are stored with each piece of artificial image data attached with shape information on a shape of the object represented by the artificial image data,
an artificial image selection means which selects an artificial image representing an object substantially conforming in structure to an object of an input medical image out of images represented by the plurality of pieces of image data stored in the artificial image storage means, and
an anatomical characteristic position detecting means which detects an anatomical characteristic position of the object on the basis of the shape information attached to the artificial image selected by the artificial image selection means,
wherein the shape information comprises:
an average shape based on the plurality of pieces of image data stored in the artificial image storage means,
eigenvectors for deforming the average shape, wherein the eigenvectors are based on the average shape and the plurality of pieces of image data stored in the artificial image storage means, and
a parameter based on at least a portion of data extracted from the object in the input medical image such that a shape of the artificial image approximates the extracted data.

5. An object structure measurement system comprising:
an artificial image storage means in which a plurality of pieces of artificial image data representing different object structures are stored with each piece of artificial image data attached with shape information on a shape of the object represented by the artificial image data,
an artificial image selection means which selects an artificial image representing an object substantially conforming in structure to an object of an input medical image out of images represented by the plurality of pieces of image data stored in the artificial image storage means,
an anatomical characteristic position detecting means which detects an anatomical characteristic position of the object on the basis of the shape information attached to the artificial image selected by the artificial image selection means, and
a measurement means which measures a structural physical value of the object on the basis of the anatomical characteristic position of the object detected by the anatomical characteristic position detecting means,
wherein the shape information comprises:
an average shape based on the plurality of pieces of image data stored in the artificial image storage means,
eigenvectors for deforming the average shape, wherein the eigenvectors are based on the average shape and the plurality of pieces of image data stored in the artificial image storage means, and
a parameter based on at least a portion of data extracted from the object in the input medical image such that a shape of the artificial image approximates the extracted data.

* * * * *